(12) United States Patent
Leighton

(10) Patent No.: US 6,616,795 B1
(45) Date of Patent: Sep. 9, 2003

(54) SEALING OF RECLOSABLE PLASTICS BAGS

(75) Inventor: Murray Edward Bruce Leighton, Harrogate (GB)

(73) Assignee: Supreme Plastics Holding Limited (GB)

(*) Notice: Subject to any disclaimer, the term of this patent is extended or adjusted under 35 U.S.C. 154(b) by 0 days.

(21) Appl. No.: 09/857,727

(22) PCT Filed: Sep. 28, 2000

(86) PCT No.: PCT/GB00/03707
§ 371 (c)(1),
(2), (4) Date: Jun. 8, 2001

(87) PCT Pub. No.: WO01/28759
PCT Pub. Date: Apr. 26, 2001

(30) Foreign Application Priority Data

Oct. 15, 1999 (GB) .............................................. 9924344

(51) Int. Cl.[7] .............................................. B32B 31/20
(52) U.S. Cl. .................. 156/308.4; 156/368; 156/583.1
(58) Field of Search ................................. 156/251, 288, 156/583.1, 583.2, 583.7, 583.9, 583.91, 155, 182, 308.4, 368, 391; 53/287, 329.2, 477; 100/92

(56) References Cited

U.S. PATENT DOCUMENTS

| 3,687,789 A | | 8/1972 | Wheeler ...................... 156/515 |
| 4,061,260 A | * | 12/1977 | Copp .......................... 156/355 |
| 5,284,002 A | * | 2/1994 | Fowler et al. ............... 493/215 |

FOREIGN PATENT DOCUMENTS

| DE | 8529054 | 1/1986 |
| GB | 439544 | 12/1935 |

* cited by examiner

Primary Examiner—Richard Crispino
Assistant Examiner—Sing Chan
(74) Attorney, Agent, or Firm—Woodcock Washburn LLP

(57) ABSTRACT

A heat sealing jaw (10), particularly for use in a form-fill-seal machine for the sealing of plastics bags incorporating a zipper seal, comprises a plurality of spaced heat sealing wires (12) in its active surface and a plurality of pressure switches (13) underlying the wires. When the jaw is moved into contact with the zipper and an overlying host material the zipper imparts pressure to a switch or switches and this effects heating of a predetermined wire or wires to create the seal at the correct position. Thus, the seal is made at the correct position even if the position of the zipper on the host material should change. A pair of aligned jaws (10) are preferably used, one on each side of the host material.

12 Claims, 2 Drawing Sheets

SEALING OF RECLOSABLE PLASTICS BAGS

This invention relates generally to the sealing of reclosable plastics bags, and is particularly concerned with sealing jaws appropriate for use on a form/fill/seal machine.

In form/fill/seal machines a film of plastics material passes through heat sealing jaws which apply heat and pressure to effect sealing at appropriate locations. Many bags made on form/fill/seal machines incorporate a zipper which has interengaging male and female profile members so that the bag is reclosable. The zipper strip is applied to the film material in advance of the heat sealing jaws. A problem which is encountered is that the position of the zipper strip on the host material can vary either over the course of time or in an essentially random manner, for example due to changes in the operating system. However, it is important that the zipper strip is sealed to the host material at a particular point in order for the closure to be effective.

It is therefore an object of the present invention to provide a sealing jaw which will enable sealing to be effected at the correct position as the host material moves intermittently through the sealing jaws, regardless of slight variations in the position of the zipper strip on the host material.

In accordance with the present invention this is achieved by the provision of a heat sealing jaw comprising a body provided with a plurality of spaced heat sealing wires, and a plurality of pressure switches associated with the wires and operable when pressure is imparted thereto to effect heating of a predetermined wire or wires.

Preferably, the heat sealing wires are spaced at a distance of the order of 0.1 mm from each other. Preferably, the wires are impulse sealing wires.

Also in accordance with the invention there is provided apparatus for the sealing of a bag of plastics material, which comprises guide means to direct a film of plastics material along a sealing path, and at least one heat sealing jaw as claimed in any of claims 1 to 5 located adjacent to said path and displaceable into contact with the film.

Preferably, the apparatus comprises a pair of said heat sealing jaws located one on each side of said path and aligned so as to be engageable on opposite sides of a double film of material.

Also in accordance with the invention there is provided a method of sealing a bag in a form-fill-seal machine, which comprises positioning lengths of zipper strip at intervals along a movable film of plastics material, forming and filling the bag material, and guiding the formed and filled bag material into a sealing path on opposite sides of which is located a first pair of heat sealing jaws for effecting a top seal of the bag and a second pair of sealing jaws for effecting sealing of the film to the zipper strip, at least one of said second pair of jaws being a heat sealing jaw in accordance with any of claims 1 to 5.

Preferably, the second pair of sealing jaws effect sealing of the film to a flange or flanges of the zipper strip which extend laterally from a pair of interengageable male and female closure members.

In order that the invention may be more fully understood one presently preferred embodiment of sealing jaw and of its application to a form-fill-seal machine in accordance with the invention will now be described by way of example and with reference to the accompanying drawings, in which.

Figure 1:
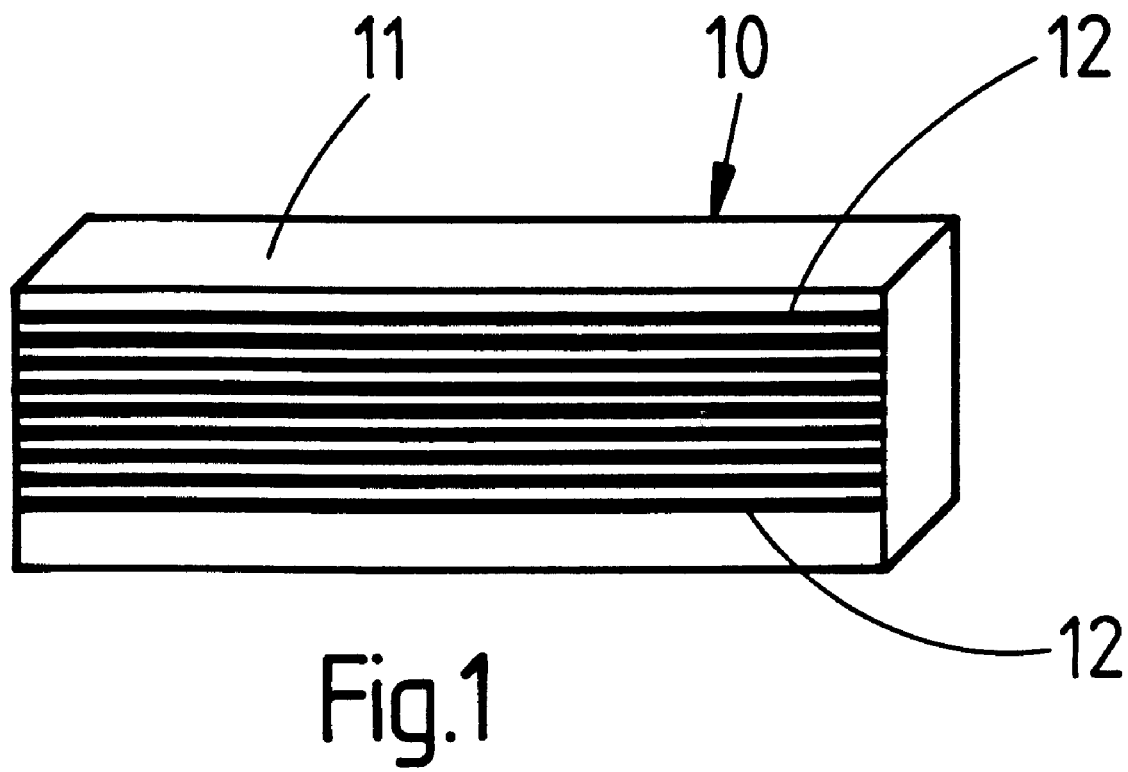
FIG. 1 is a view of a sealing jaw provided with a plurality of impulse sealing wires in accordance with the invention.
Figure 2:
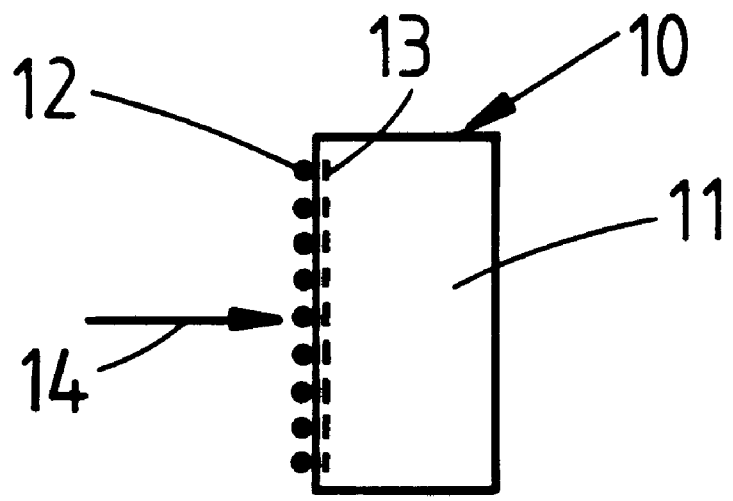
FIG. 2 is a side view of the sealing jaw shown in FIG. 1.

FIGS. 1 and 2 show a sealing jaw 10 comprising a body 11 which is provided on one face with a plurality of spaced impulse sealing wires 12. These are spaced at a distance of for example 0.1 mm between the individual wires 12. Within the body 11 and behind each of the wires 12 is located a pressure switch 13 as indicated schematically in FIG. 2. The jaw is connected to appropriate electrical circuitry so that when one of the pressure switches 13 has pressure exerted against it, as indicated by arrow 14, that pressure switch will be activated and trigger the application of electric current to a chosen wire or wires to cause it or them to be heated.

Figure 3:
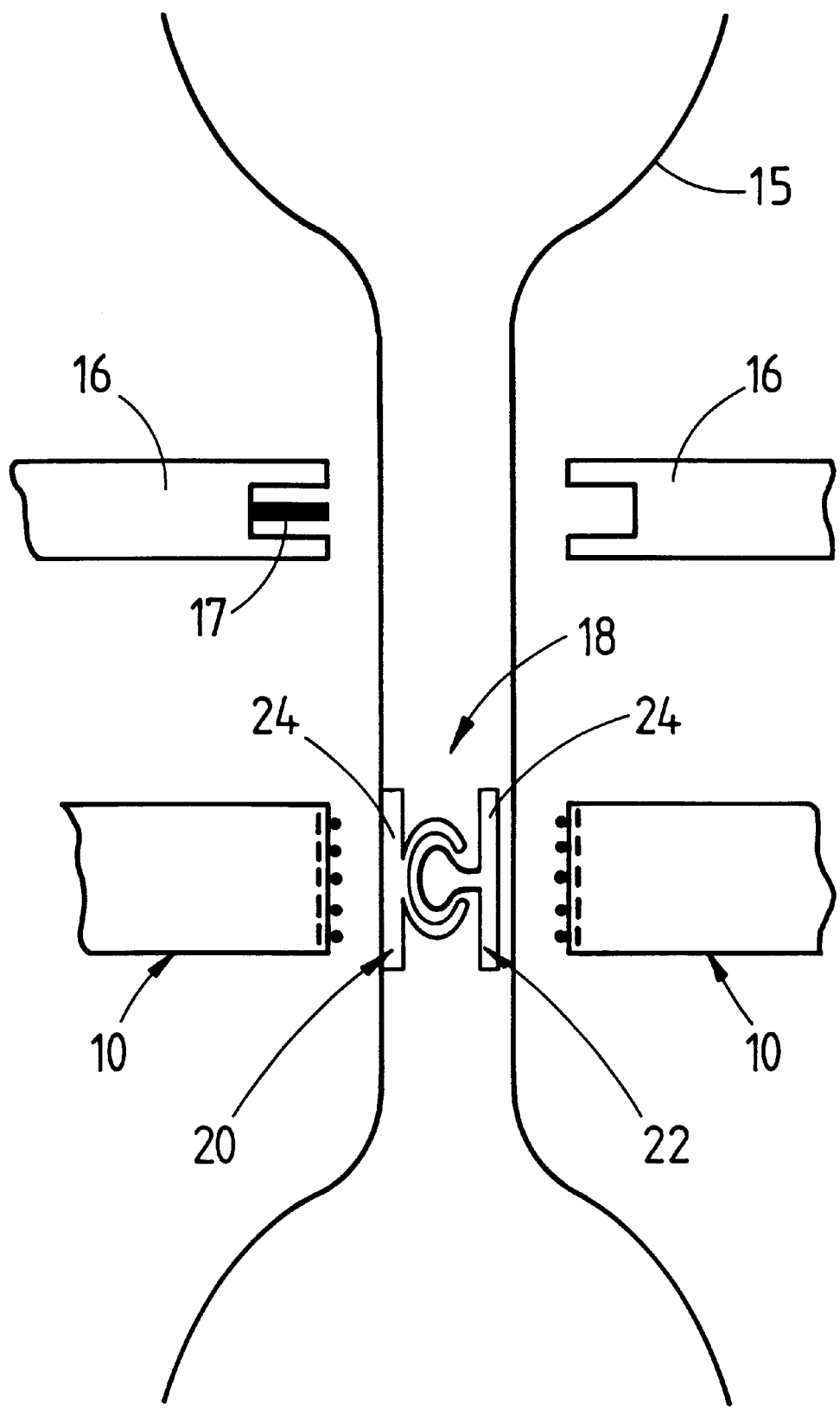
FIG. 3 is a schematic diagram showing a pair of sealing jaws in accordance with the invention in relation to bag material and a zipper strip.

FIG. 3 shows two such sealing jaws 10 positioned one on each side of the path along which a partially formed and filled bag of plastics material 15 travels, here in a downward direction. Each of the jaws 10 is provided with impulse sealing wires and pressure switches as described above. Above the under jaws 10 there is provided a pair of upper sealing jaws 16, one of which incorporates a knife blade 17 whose purpose is to sever the filled and sealed bags. The upper jaws incorporate heating means in their faces which contact the host material 15 to create a top seal, but the position. of these upper jaws 16 in relation to the host material 15 is less critical than the relationship between the under jaws 10 and the host material. This is because the film 15 is provided at intervals with a zipper strip 18. The zipper strip 18 comprises a pair of interengageable male and female closure members 20 and 22, each of which has a flange or flanges 24 extending laterally from the profile zone. In FIG. 3 a pair of flanges 24 is shown for each closure member. The host material, i.e. the film 15, has to be sealed to the underlying flange or flanges by the jaws 10 at the correct location to effect a proper seal. The zipper strip 18 has already been sealed to the film material 15 at the flange or flanges on one side when it is applied to the host material and the purpose of the under jaws 10 is to effect the sealing of the flange or flanges on the other side of the zipper strip to the other web of the film. The position of this sealing is critical and quite a small variation in the relative position between the zipper strip and the jaws 10 can result in failure. With the jaws 10 of the present invention, when they are brought together within the sealing cycle, in synchronism with the intermittent downward movement of the host material 15, the presence of the protuberant male and female profiles of the zipper strip will activate particular ones of the pressure switches 13 and cause the heating of one or more of the wires 12 to effect heat sealing at the correct location or locations.

It should be noted that although it would normally be the impulse sealing wire 12 located immediately above the activated pressure switch which would be heated, one could alternatively arrange for the activation of a particular pressure switch to cause the heating of one or more wires 12, not necessarily the wire immediately overlying that switch. This would depend upon exactly where one wished to seal the zipper strip to the film.

In the illustrated embodiment, the under jaws 10 are shown operating in relation to a downwardly moving host material to which zipper strips 18 have been applied transversely to the direction of movement of the host material, i.e. using cross web technology. The sealing jaws of the present invention could also be utilised in other sealing situations where there is a need to be able to seal materials together at an exact location even in the event of some variation in the position of the article in relation to the sealing jaws.

One could also use just one such sealing jaw in combination with an aligned unheated pressure pad on the far side of the material to be sealed in contrast to the illustrated embodiment where one has two opposing jaws 10 both of which are designed to apply heat and pressure to the host material 15.

What is claimed is:

1. A heat sealing jaw comprising a body provided with a plurality of spaced heat sealing wires, and a plurality of pressure switches associated with the wires and operable when pressure is imparted thereto to effect heating of a predetermined wire or wires.

2. A heat sealing jaw according to claim 1, in which the number of pressure switches is equal to the number of heat sealing wires.

3. A heat sealing jaw according to claim 1, in which the heat sealing wires are spaced from each other at a distance of the order of 0.1 mm.

4. A heat sealing jaw according to claim 1, in which the wires are impulse sealing wires.

5. A heat sealing jaw according to claim 1, in which said heat sealing wires are provided on a face of the body, and a pressure switch of said plurality of pressure switches is located behind each respective wire.

6. A heat sealing jaw according to claim 5, in which the actuation of at least a predetermined one of said pressure switches is arranged to heat a wire or wires other than the wire which overlies said predetermined pressure switch or switches.

7. Apparatus for the sealing of a bag of plastics material, which comprises guide means to direct a film of plastics material along a sealing path, and at least one heat sealing jaw located adjacent to said path and displaceable into contact with the film, said heat sealing jaw comprising a body provided with a plurality of spaced heat sealing wires, and a plurality of pressure switches associated with the wires and operable when pressure is imparted thereto to effect heating of a predetermined wire or wires.

8. Apparatus according to claim 7, comprising a pair of said heat sealing jaws located one on each side of said path and aligned so as to be engageable on opposite sides of a double film of material.

9. Apparatus according to claim 7, comprising one said jaw on one side of said path and an unheated pressure pad aligned therewith on the other side of said path, with the jaw and pad being displaceable into engagement.

10. Apparatus according to claim 7, which includes a pair of said heat sealing jaws, and a second pair of sealing jaws positioned upstream of the heat sealing jaws in the sealing path, each pair of jaws being arranged to effect a sealing of a double film of material.

11. A method of sealing a bag in a form-fill-seal machine, which comprises positioning lengths of zipper strip at intervals along a movable film of plastics material, forming and filling the bag material, and guiding the formed and filled bag material into a sealing path on opposite sides of which is located a first pair of heat sealing jaws for effecting a top seal of the bag and a second pair of sealing jaws for effecting sealing of the film to the zipper strip, at least one of said second pair of jaws being a heat sealing jaw comprising a body provided with a plurality of spaced heat sealing wires, and a plurality of pressure switches associated with the wires and operable when pressure is imparted thereto to effect heating of a predetermined wire or wires.

12. A method according to claim 11, in which the second pair of sealing jaws effect sealing of the film to a flange or flanges of the zipper strip which extend laterally from a pair of interengageable male and female closure members.

* * * * *

UNITED STATES PATENT AND TRADEMARK OFFICE
CERTIFICATE OF CORRECTION

PATENT NO. : 6,616,795 B1
DATED : September 9, 2003
INVENTOR(S) : Murray Edward Bruce Leighton It is certified that error appears in the above-identified patent and that said Letters Patent is hereby corrected as shown below:

Title page,
Item [73], Assignee, should read: -- Supreme Plastics Holdings Limited --

Column 2,
Line 25, delete "." after "position".

Signed and Sealed this

Sixth Day of July, 2004

JON W. DUDAS
*Acting Director of the United States Patent and Trademark Office*